United States Patent
Muehllegner

[15] 3,684,886
[45] Aug. 15, 1972

[54] TOMOGRAPHIC IMAGING DEVICE USING A ROTATING SLANTED MULTICHANNEL COLLIMATOR

[72] Inventor: Gerd Muehllegner, Glenview, Ill.

[73] Assignee: Nuclear-Chicago Corporation, Des Plaines, Ill.

[22] Filed: April 13, 1970

[21] Appl. No.: 27,492

[52] U.S. Cl. ..............250/71.5 S, 250/61.5, 250/105
[51] Int. Cl..............................G01t 1/20, G21f 5/04
[58] Field of Search..................250/71.5 S, 61.5, 105

[56] References Cited

UNITED STATES PATENTS 3,432,660  3/1969  Anger...................250/71.5 S
3,011,057  11/1961 Anger.................250/71.5 S X Primary Examiner—Archie R. Borchelt
Attorney—Lowell C. Bergstedt, Walter C. Ramm and Helmuth A. Wegner

[57] ABSTRACT

A stationary Anger-type radiation detector fitted with a rotating slanted multichannel collimator and a floating patient bed precessing in a synchronous manner with the rotation of the collimator produce tomographic images of the distribution of radionuclides throughout an object on the bed.

9 Claims, 6 Drawing Figures

TOMOGRAPHIC IMAGING DEVICE USING A ROTATING SLANTED MULTICHANNEL COLLIMATOR

In a co-pending patent application of William G. Walker entitled "Tomographic Radiation Camera," Ser. No. 774,320, filed Nov. 8, 1968, a camera device for producing selected tomographic images of the distribution of radionuclides throughout an object under investigation is disclosed. The embodiment disclosed comprises essentially an Anger-type detector (U. S. Pat. No. 3,011,057) with a rotatable, slanted multichannel collimator between the crystal in the detector and the object under investigation. Rotation of the slanted hole collimator produces circular patterns of scintillations in the crystal from gamma rays emanating from a point source or elemental volume of radionuclides in the object. The $x,y$ coordinate output signals from the detector head are transformed in accordance with specified sine and cosine signals derived from the position of the rotating collimator to produce signal inputs to a cathode ray tube (CRT) for displaying an in-focus image on the face panel of the CRT of the distribution of radionuclides across a selected plane through the object.

In a co-pending patent application of this inventor entitled "Tomographic Imaging Device," Ser. No. 806,449, filed Mar. 12, 1969, an improvement over the Walker device is disclosed. The improvement involves precessing the detector head in a circle in synchronism with rotation of a slanted multichannel collimator mounted thereon to enlarge the useful field of view of the imaging device to at least equal the useful diameter of the crystal at some selected distance from the face of the collimator. Precession of the detector head, however, would require that either the detector head mounting arrangement be changed from that of the typical Anger-type scintillation camera or the heavy stand supporting the detector head be mounted on a precessing support structure.

Therefore, the principal object of this invention is to provide an improved tomographic imaging device which is readily adaptable to existing installations of scintillation cameras.

This object is accomplished in a preferred embodiment of this invention by providing for the object under investigation a support means which includes a floatable table so that the object may be precessed in a circle with respect to a stationary detector head with a rotating slanted hole collimator mounted thereon. Thus a tomographic capability may be added to existing scintillation camera systems by providing a rotating collimator which attaches to the detector head in the usual manner and a precessing bed which may be a modified version of floating top X-ray tables which are commercially available. Synchronism of the precessing bed and rotating collimator may be accomplished in any number of ways that would suggest themselves immediately to one skilled in the art, such as the use of repeating drive motors. Moreover, alignment of the bed and the rotating collimator may also be accomplished in many readily apparent fashions including the use of a clamp mechanism to secure the table in a reproducible orientation with respect to the detector head and limit switch controls to drive separately the floating table top and the rotating collimator to appropriate reproducible positions. In addition, if the scintillation camera is of the type which produces coordinate electrical signals to define the location of scintillation events, appropriate electronics may be added to the system to provide a display of in-focus images at selectable depths or multiplane displays using either multiple display devices or multiplexed images on a single display device.

Other objects, features, and advantages of this invention will be apparent from a consideration of the following detailed description in conjunction with the accompanying drawings in which.

Figure 1:
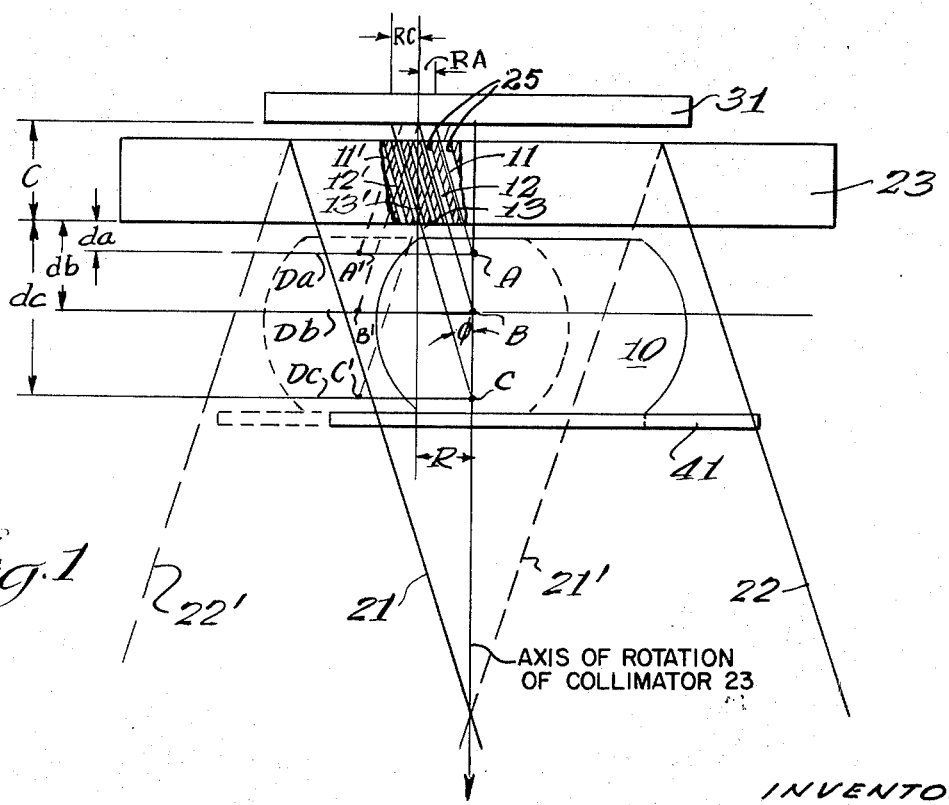
FIG. 1 is a schematic view of a portion of a preferred embodiment of this invention useful in describing its operation.

Referring now to FIG. 1, a collimator 23 is shown interposed between a radiation sensitive transducer 31 and an object 10 under investigation. Object 10 rests on a table top 41 which extends substantially parallel to transducer 31. Collimator 23 is a radiation shielding means which defines, at any instant, a substantially uniform radiation acceptance direction for each elemental area of transducer 31 and comprises essentially a cylindrical volume of radiation opaque material, such as lead, defining a plurality of collimating channels 25. In essence collimator 23 is similar to parallel channel collimators which are in general commercial use except that the channels are aligned at an angle $\theta$ to a line normal to transducer 31, with $\theta$ less than 90° but greater than 0°. A typical collimator may have from 1,000 to 4,000 channels each angled at 20°. The particular angle of the collimator channels determines, to some extent the sharpness of the focus or tomographic image, but it is believed that for most gamma ray imaging an angle of about 20° provides good tomographic imaging with a useful configuration of constant sensitivity field of view. A cross-section of the individual collimating channels may be square, round, hexagonal or any other desired configuration, and the length of the collimator and number of holes may be chosen for the particular gamma emitting isotope or other imaging parameters in a known fashion.

In a preferred embodiment of this invention which involves an Anger-type radiation detector, transducer 31 is a thin (about one-half inch) cylindrical crystal of thallium-activated sodium iodide which may have essentially any desired diameter, but is about 12 ½ inch in diameter in the most widely used commercial versions of the Anger-type scintillation camera. The other elements of an Anger-type detector, such as light pipes, an array of photomultiplier tubes, etc., are not shown but are well known from the descriptions in Anger's U. S. Pat. No. 3,011,057, and in numerous publications on Anger-type scintillation cameras.

Table top 41 is free to precess, that is to change its position in a single plane without rotating. Floating top X-ray tables are available commercially and are of relatively simple construction. For purposes of illustration, only the top 41 is shown in FIG. 1, and the solid-line position will be considered a reference position. With top 41 in this reference position collimator 21 is oriented in its reference position with all of the channels directed maximally toward the right. Similarly top 41 is at the maximum extent of its rightward movement. As collimator 23 rotates about its central axis, top 41 precesses in a synchronous manner so that object 10 is always in the field of view between lines 21 and 22. When the precession and rotation have progressed through 180° or one-half revolution the field of view will be between lines 21' and 22', and object 10 and top 41 will be in the position shown in dotted lines. Each point on top 41 and object 10 will have travelled in a semi-circle of radius R without rotating. Thus sources A, B, and C will each have precessed through 180° at radius R and will occupy positions A', B', and C'. Assuming precession and rotation in a clockwise manner when looking down on transducer 31, the image generated by a gamma ray source at A would be a circle of radius RA, the image of a source at B is a single point, and the image of a source at C is a circle of radius RC. It is easily seen that the image of a source at B remains a stationary point because of the fact that B is on a plane at a distance ($c + db$) from transducer 31 where ($c + db$) tan $\theta = R$. In other words the displacement of the image of B on transducer 31 because of collimator channels angled at an angle $\theta$ is exactly equal to the radius of precession R. From this it is apparent that all points on plane $Db$ generate a stationary image on transducer 31. The readout or display from the scintillation camera will be automatically in-focus for the radionuclides distributed across plane $Db$. Other planes through object 10 could be "focussed" on by simply changing the distance of object 10 from transducer 31 or by changing the radius of precession of top 41. If the radius of precession is decreased the plane of focus is closer to transducer 31, and if it is increased, the plane of focus is further from transducer 31.

If the radiation detector employed in this invention is of the type which produces coordinate electrical output signals $x,y$ related to the location of a scintillation, it is readily apparent that, for each scintillation event, the $x,y$ coordinate signals may be transformed in accordance with the instantaneous position of collimator 23 or top 41, so that a displayed in-focus image of radionuclides on a plane other than the natural focal plane is produced. In particular, it should be apparent that linear potentiometers could be used to follow the circular precession of top 41 and produce $x',y'$ coordinate signals which would take on values between $-R$ and $+R$ and represent the sine and cosine values of a rotating vector of magnitude R. By adding appropriate proportions of the instantaneous $x',y'$ signal to $x,y$ signals from the detector, corrected position coordinates X,Y are produced and will result in an in-focus display of a plane closer to transducer 31.

In a similar fashion planes farther away from transducer 31 can be displayed by adding appropriate proportions of the instantaneous $x',y'$ signals to the $x,y$ signals from the detector. This can be expressed in equation form in the following manner:

$$X = x + kx'$$

$$Y = y + Ky'$$

where $k$ takes on negative values for planes on the transducer side of the natural focal plane and positive values for planes further away from the transducer. Also the magnitude of $k$ is proportional to the distance of the in-focus plane from the natural focal plane. The construction of circuitry to perform this function is well within the skill of the art.

Figure 2:
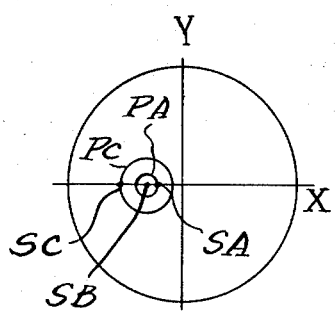
FIGS. 2 through 4 are pictorial representations of various tomographic output images corresponding to the schematic shown in FIG. 1.
Figure 3:
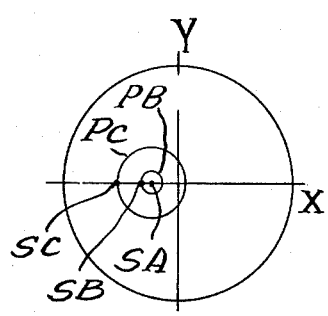
Figure 4:
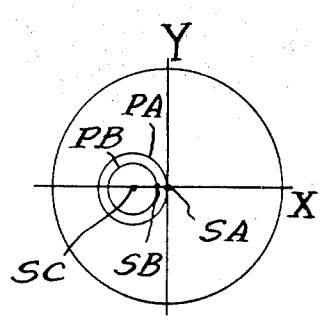

In FIG. 2 the resulting images from sources A, B, and C with no correction applied to coordinate signals $x,y$ are shown. The image of source B is a point while the images of sources A and C are circles. It should be understood that FIGS. 1 through 4 are based on an idealized geometrical approach, and in reality point sources would generate a distribution of scintillations around a point or on both sides of a circle. Moreover, the detector introduces additional resolution loss, so there are never any sharp points or circles in the actual readout. In FIG. 3, the images resulting from correcting $x,y$ signals to provide an in-focus image of source A are shown, and in FIG. 4, the images resulting when source C is in-focus are shown. It should be apparent that in FIG. 2 all of the elemental volumes of radionuclides on plane $Db$ would be in-focus, and in FIGS. 3 and 4 all of the elemental volumes of radionuclides on planes $Da$ and $Dc$, respectively would be in focus.

Figure 5:
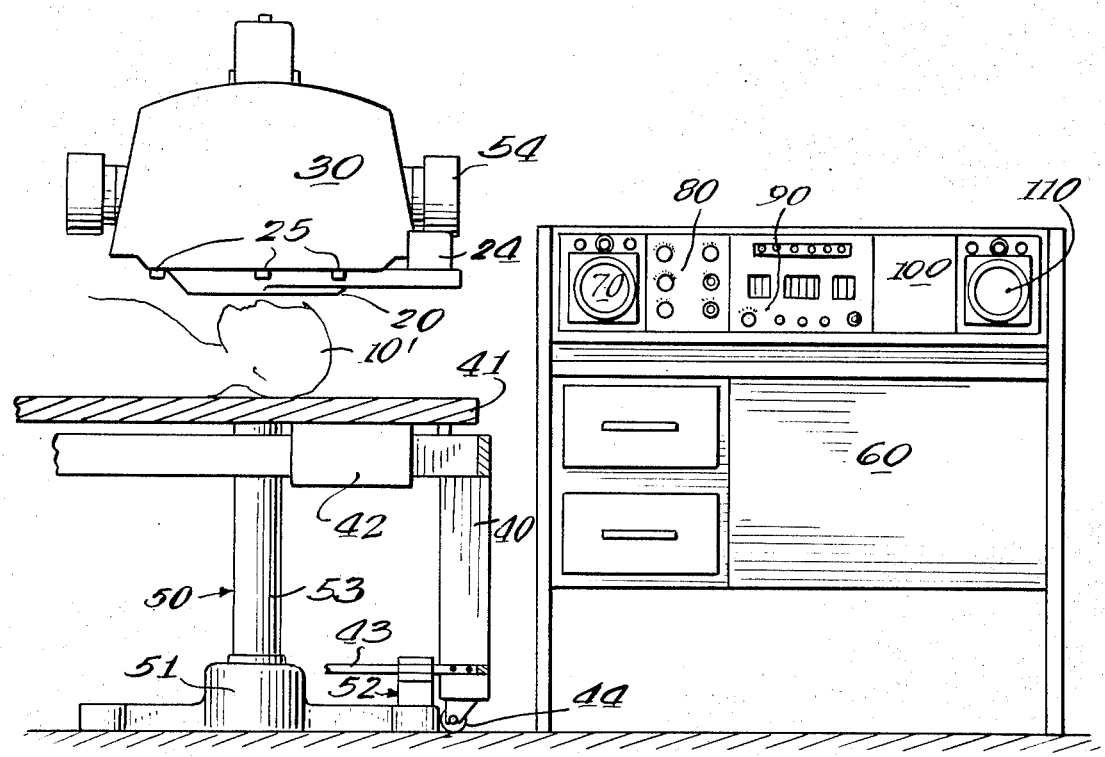
FIG. 5 is a pictorial view of a physical arrangement of a tomographic imaging device of this invention.

In FIG. 5 the physical arrangement of tomographic apparatus using a commercial version of an Anger-type scintillation camera is depicted. The major elements of the commercial camera are a detector head 30, a stand or support structure 50 for holding head 30, and a console 60 which is connected to head 30 by cabling not shown. Detector head 30 comprises a crystal assembly including a thallium-activated sodium iodide crystal, a light pipe, a bank of photomultiplier tubes (usually 19 tubes in a close packed hexagonal array), and circuitry to develop $x+x-y+$ and $y-$ signals for transmission to console 60. Typically stand 50 supports head 30 such that it can move vertically and rotate on two axes in a horizontal plane. Base 51 and vertical column 53 are the main structural support members, and yoke assembly 54 rides up and down in a motorized fashion on column 53. Yoke assembly 54 usually comprises a C-arm member, on which head 30 is rotatably mounted, and which is itself rotatably mounted on a frame which rides on column 53. The rotating of head 30 and the C-arm are usually motorized as well so that head 30 can be flexibly positioned with extreme ease. Indicators are provided to show the angles of the head and C-arm.

Console 60 contains all of the power supplies needed for head, detector stand, and console equipment. Included in console 60 in the typical scintillation cameral system are main display module 70, image data computer module 80, central control module 90, and an auxiliary display module 110. Computer module 80 contains circuitry for developing the initail $x,y$ signals, a $z$ signal which represents the energy of the scintillation, final $x,y$ signals normalized by the $z$ signal, and pulse height analysis circuitry to produce a trigger or unblanking signal when the $z$ signal is within a selected range. Display module 70 displays on a CRT the $x,y$ signals which are accompanied by a trigger signal. Control module 90 contains scaling and timing circuitry with registers and digital display apparatus together with other control features. Display module 110 can repeat the display of information on module 70 or accept other information for simultaneous display.

When functioning as a scintillation camera to produce normal two-dimensional studies, head 30 will have a multichannel collimator or a pinhole collimator will be perpendicular to the crystal except in the case of a diverging collimator. The patient and head will both be stationary, but the head may be in one of many positions or orientations. The scintillation camera becomes a tomographic camera by placing a rotating collimator assembly 20 on head 30 and providing a table 40 with a precessing top 41 to support the object under investigation. Head 30 must of course be in a horizontal position with the crystal therein substantially parallel to top 41.

Rotating collimator assembly 20 may be constructed in a variety of ways. A typical multichannel collimator comprises a collimator insert and a frame in which the insert is mounted. To make the slanted hole collimator insert rotatable it can be mounted in the frame on bearings in a variety of ways. Rotation may then be performed by a motor 24 driving a pulley and belt arrangement or a gear arrangement for example. Commercial scintillation cameras usually have collimators which fasten to the head structure and may easily be mounted and removed by using a storage cart to hold the collimator when not in use. Rotating collimator assembly 20 is shown in FIG. 5 fastened to head 30 by fasteners 25 which may be thumbscrews. Assembly 20 may be stored on the typical collimator cart when not in use and may easily be mounted to head 30 when needed.

Table 40, as mentioned above, may be a commercially-available X-ray table with a floating top 41, i.e., one which has freedom to move in two directions simultaneously, and apparatus 42 to cause top 41 to precess in a circle of selected radius. Precessing drive apparatus 42 can take many forms, e.g., a simple motor driven rotating lever arm attached to the underside of the table will perform the required task. Synchronized rotation of the collimator and precession of the top may be accomplished in a known fashion by using repeating drive motors. However, since rotation of the collimator and precession of the top are not linked mechanically, it is necessary that an initial alignment of top 41 and the rotating collimator insert be performed. This also can be accomplished by a variety of straightforward approaches. For example a clamping arrangement 52 on base 51 of stand 50 may be used to position a fixed member 43 on table 40 in a reproducible orientation. Detector head 30 is placed in a reproducible horizontal position using markers on the C-arm. Limit switch arrangements may then be activated to drive the collimator insert and the table top to appropriate reproducible positions.

Figure 6:
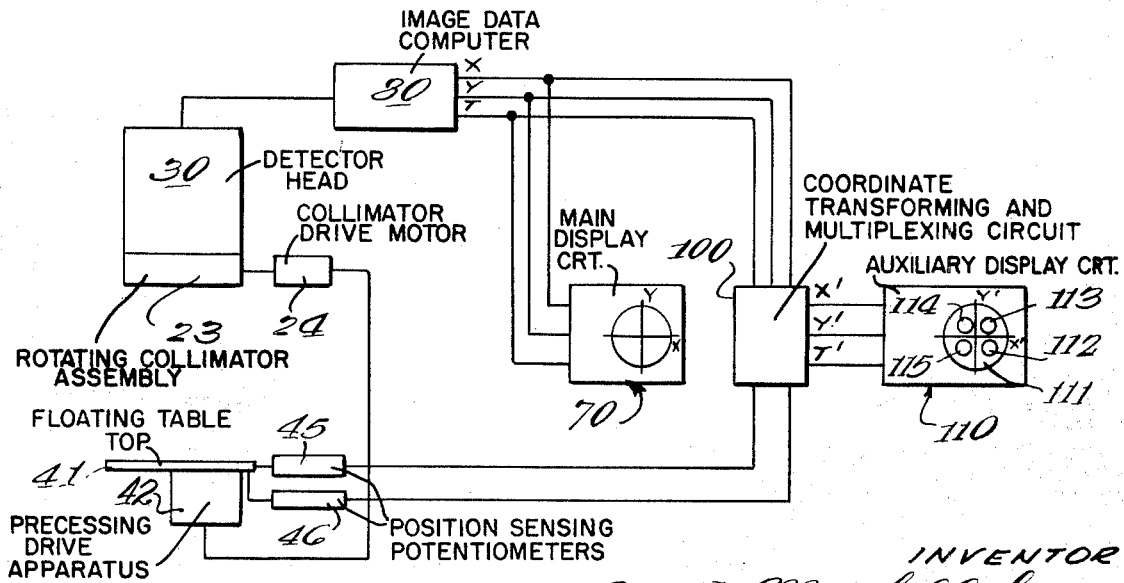
FIG. 6 is a block schematic diagram of electrical circuitry in accordance with a preferred form of this invention.

With the arrangement described above, it will be apparent that a single plane tomographic display will automatically be produced on the CRT in display module 70. Addition of very simple electronic circuitry in console 60 and position-sensing potentiometers on table 40 would enable a second in-focus display to be produced on the CRT in display module 110. This would be accomplished by producing corrected position coordinate signals as previously described. However, the most useful readout is thought to be a simultaneous multiplane readout which may be accomplished as shown schematically in FIG. 6 by multiplexing four images onto a single CRT. Computer circuitry 80 develops $x,y$ coordinate signals and an unblanking signal T for each scintillation event in head 30 which is to be displayed. The $x,y$ signals produce a single display on the CRT in module 70 which results in an in-focus display of the natural focal plane. The $x,y$, and T signals are also coupled to a coordinate transforming and multiplexing circuit 100 which also receives position information from potentiometers 45 and 46 which sense the position of tops 41. Circuit 100 produces four sets of corrected coordinate signals which are sequentially applied to leads $x',y'$ with an unblanking signal to produce four separate dots for each scintillation event. Each set of corrected coordinate signals is associated with an in-focus display of a separate plane so a time lapse photograph of the face 111 of the CRT in module 110 will show four sets of in-focus planes 112 through 115. The location of these planes may be made selectable or may be fixed to have a certain specified separation from one plane to the next. The circuitry to perform this coordinate transformation and multiplexing may easily be constructed in a variety of ways by one skilled in the art.

It should be understood that this invention can employ any other type of gamma ray camera such as image intensifiers types and spark chamber types. It should also be understood that head 30 could be positioned underneath table top 41 as well, and that the invention could be adapted to a special camera arrangement devoted solely to tomographic imaging so that the head, collimator and table are relatively fixed, and the unit has only limited capability for use as a regular scintillation camera. Accordingly, the scope of this invention is not limited to described embodiments since numerous modifications could be made without departing from the scope of this invention as claimed in the following claims.

I claim:

1. In a device for imaging the volume distribution of radionuclides throughout an object under investigation, in combination:

a radiation detector, including a substantially planar radiation sensitive transducer, of the type producing an output representing plane position coordinates of each quantum of radiation interacting with said transducer, said detector adapted to be held stationary;

support means for supporting said object in view of said detector;

radiation shielding means interposed between said transducer and said object defining a substantially uniform radiation acceptance direction from said object to said transducer; and driving means operatively associated with said support means and said radiation shielding means for changing the position of said object with respect to said radiation detector and simultaneously changing said radiation acceptance direction defined by said radiation shielding means in a synchronous manner to produce predetermined patterned movement of images generated on said transducer by quanta of radiation emanating from radionuclides in elemental volumes of said object, said predetermined patterned movement differing in accordance with the volume position coordinates of each said elemental volume such that the output from said detector may be translated into useful information concerning the distribution of radionuclides across a plane through said object at any selected distance from said transducer.

2. The combination as claimed in claim 1, further comprising means receiving said output from said radiation detector operative to translate said output in accordance with said predetermined patterned movement into a useful image presentation of the distribution of radionuclides across a plane through said object at a preselected distance from said transducer.

3. In a device for imaging the volume distribution of radionuclides throughout an object under investigation, in combination:

a radiation detector, including a substantially planar radiation sensitive transducer, of the type producing an output representing plane position coordinates of each quantum of radiation interacting with said transducer, said detector adapted to be held stationary;

support means for supporting said object in view of said detector;

a collimator of substantially radiation opaque material rotatably mounted on said detector between said transducer and said object, said material defining an array of mutually spaced apertures each having a common non-normal axial orientation with respect to said transducer; and driving means for simultaneously rotating said collimator and precessing said support means in a circle of selected radius in a synchronous manner such that elemental volumes of radionuclides on a reference plane through said object parallel to said transducer generate stationary images on said transducer and elemental volumes of radionuclides on other parallel planes generate images which are circular with a radius dependent upon the distance of each from said reference plane, the distance between said transducer and said reference plane being a predetermined function of said radius of circular precession and the degree of said non-normal axial orientation.

4. The combination as claimed in claim 3, wherein said output of said detector comprises a first pair of signals representing said plane position coordinates; and further comprising:

sensing means for producing a second pair of signals representing plane position coordinates of said precessing support means; and translating means receiving said first and second pairs of signals operative to produce a third pair of signals representing corrected position coordinates of each quantum of radiation interacting with said transducer, said corrected position coordinates being associated with an in-focus image of the distribution of radionuclides across a preselected plane through said object.

5. Apparatus for imaging the volume distribution of radionuclides throughout an object under investigation comprising, in combination:

a radiation detector, including a substantially planar radiation sensitive transducer, of the type producing a first pair of output signals, $x$ and $y$, representing plane position coordinates of each quantum of radiation interacting with said transducer, said detector adapted to be held stationary;

support means for supporting said object in view of said detector;

a multichannel radiation collimator rotatably mounted on said detector between said transducer and said object, the axis of each of the channels of said collimator making an angle $\theta$ with respect to a line normal to said transducer;

driving means for simultaneously rotating said collimator and precessing said support means in a circle of selected radius R in a synchronous manner;

sensing means for producing a second pair of signals, $x'$ and $y'$, representing plane position coordinates of said precessing support means as a function of time;

translating means receiving said first and second pairs of signals operative to produce a third pair of signals, X and Y, in accordance with the following equations $$X = x + kx',$$

$$Y = y + ky'$$

where $k$ is a predetermined proportion of the distance $d$ of a plane through said object from a reference plane at a distance D from said transducer defined by the equation $$D = R \operatorname{ctn} \theta,$$

and $k$ has a negative value for planes between said reference plane and said transducer and a positive value for planes on the other side of said reference plane; and image display means operative to produce an elemental indicia located in accordance with said third pair of signals.

6. Apparatus for imaging an object having a three dimensional distribution of radioactivity therethroughout, comprising:

a radiation detector including a radiation sensitive transducer having a two dimensional radiation detecting capability and output means associated with said transducer operative to produce visible elemental output signals corresponding in time and relative spatial displacement to the position of interaction of a quantum of radiation with said transducer, said detector adapted to be held stationary;

a multichannel radiation collimator rotatably mounted on said detector in a position adjacent said transducer, the axis of each channel of said collimator having substantially the same non-normal angular orientation with respect to said transducer;

support means for supporting said object in view of said detector through said collimator; and driving means for simultaneously rotating said collimator and precessing said support means in a circle of selected radius in a synchronous manner such that said object remains in view of said detector, whereby said output signals from said detector provide an in-focus image of the distribution of radionuclides across a particular plane through said object at a depth depending upon said angular orientation and said selected radius.

7. Apparatus for producing a tomographic image of an object containing a three dimensional distribution of radionuclides comprising, in combination:
an Anger-type radiation detector fixed in a stationary position;
a multichannel radiation collimator rotatably mounted on said detector, the axis of each channel of said collimator having substantially the same non-normal angular orientation with respect to said detector;
support means including a floatable table for supporting said object in a movable fashion adjacent said collimator; and
driving means for simultaneously rotating said collimator and precessing said table in a circle of preselected radius in a synchronous manner to produce automatically a displayed in-focus image of the distribution of radionuclides across a plane through said object at a depth determined by said selected radius and the angle of said collimator channels.

8. Apparatus as claimed in claim 7, further comprising circuit means for transforming the position coordinate signals in said detector in accordance with said circular precession such that said detector selectively produces a displayed in-focus image of the distribution of radionuclides across other planes through said object.

9. Apparatus for producing a tomographic image of an object containing a three-dimensional distribution of radio-nuclides comprising, in combination:
a radiation detector of the type producing relatively spaced light flashes corresponding to position coordinates of gamma rays interacting with said detector, said detector being fixed in a stationary position;
a multichannel radiation collimator rotatably mounted on said detector, the axis of each channel of said collimator having substantially the same non-normal angular orientation with respect to said detector;
support means including a floating table for supporting said object in a movable fashion adjacent said collimator; and
driving means for simultaneously rotating said collimator and precessing said table in a circle of selected radius in a synchronous manner, whereby said detector automatically produces a displayed in-focus image of the distribution of radionuclides across a plane through said object at a depth determined by said selected radius and other planes may be imaged in-focus by altering said radius of precession or the distance between said object and said detector.

* * * * *